*Reuben Harpster's*

PATENTED NOV 22 1870

109511

*Clod Fender.*

Witnesses
Harry King
C. L. Ewert

Inventor.
Reuben Harpster
per
Alexander Mason
Attys.

United States Patent Office.

REUBEN HARPSTER, OF WEST CAIRO, OHIO.

Letters Patent No. 109,511, dated November 22, 1870.

---

IMPROVEMENT IN CLOD-FENDERS.

---

The Schedule referred to in these Letters Patent and making part of the same.

---

*To all whom it may concern:*

Be it known that I, REUBEN HARPSTER, of West Cairo, in the county of Allen and in the State of Ohio, have invented certain new and useful Improvements in Clod-Fender; and do hereby declare that the following is a full, clear, and exact description thereof, reference being had to the accompanying drawing and to the letters of reference marked thereon making a part of this specification.

The nature of my invention consists in the construction of a clod-fender, and in the mode of adjusting and fastening the same to a plow, as will be hereinafter fully set forth.

In order to enable others skilled in the art to which my invention appertains to make and use the same, I will now proceed to describe its construction and operation, referring to the annexed drawing, in which—

A represents the plow-beam;

B B, the plow-shanks;

C C, the plows; and

D D, the handles;

Which may all be constructed in any of the known and usual ways.

Figure 1:
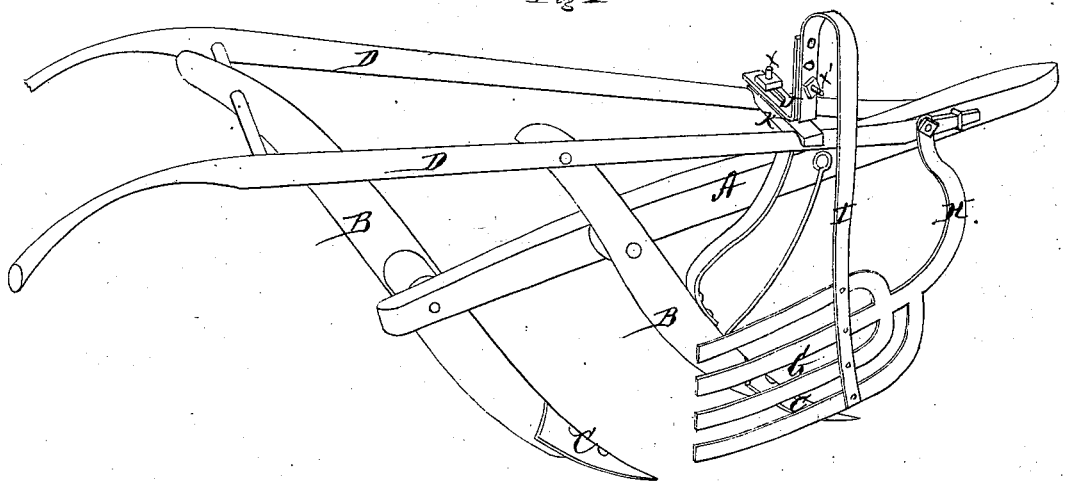
Figure 1 is a perspective view of the plow, with clod-fender attached.

G represents the clod-fender, constructed, as shown in fig. 1, in the shape of a four-pronged fork, and having an arm, H, extending forward and upward to near the front end of the handle, where it is secured by a bolt and nut, as shown.

The upper end of the arm H is provided with several holes, through either one of which the said bolt may pass to secure it in place, thus admitting of its adjustment to suit the nature of the work or the depth at which the plows work.

Across the prongs of the clod-fender G, near the base thereof, is secured a bar, I, which extends upward for a suitable distance, and is then bent inward toward the plow-beam, and then downward, where it is secured by a bolt and nut to an L-shaped standard, J, which is adjusted upon a cross-bar, K, secured on the handles.

Figure 2:
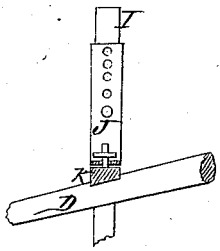
Figure 2 is a section showing the mode of adjusting the clod-fender.

The upright portion of the standard J has a number of holes, as shown in fig. 2, so that the bar I can be adjusted and secured at any height desired to regulate the height of the fender.

The L-shaped standard J is adjusted on the cross-bar K by means of a slot in its horizontal portion, through which a bolt passes to secure it to the cross-bar.

By this means the distance of the fender from the plow is easily regulated.

Having thus fully described my invention,

What I claim as new, and desire to secure by Letters Patent, is—

The construction of the adjustable spring bar I, the open-fingered fender G H, and the perforated and slotted L-shaped bar J, when the several parts are arranged in relation to the plow, as specified.

In testimony that I claim the foregoing, I have hereunto set my hand this 29th day of June, 1870.

REUBEN HARPSTER.

Witnesses:
CHAS. M. HUGHES.
THOS. M. ROBB.